United States Patent [19]

Prouty et al.

[11] 3,757,202

[45] Sept. 4, 1973

[54] LINE VOLTAGE REGULATOR

[75] Inventors: Robert E. Prouty; Martin Wolff, both of Logansport; Lloyd Bixler, Bringhurst, all of Ind.

[73] Assignee: Essex International, Inc., Wayne, Ind.

[22] Filed: Sept. 11, 1972

[21] Appl. No.: 287,757

[52] U.S. Cl. .................. 323/45, 323/57, 323/62, 317/43
[51] Int. Cl. ............................................ H01f 31/02
[58] Field of Search ................... 323/43.5, 45, 57, 323/58, 62, 46, 47; 317/43, 20

[56] References Cited
UNITED STATES PATENTS 3,378,759  4/1968  Eaves et al. ..................... 323/45 X
3,419,790  12/1968  Guhn ............................. 323/43.5

*Primary Examiner*—Gerald Goldberg
*Attorney*—Robert D. Sommer

[57] ABSTRACT

This invention comprises a circuit and apparatus for sensing the input voltage to a device and for boosting the input voltage when it falls below a predetermined acceptable level so that the voltage supplied to a device is relatively constant. A sensing circuit acts to switch in the boost winding of an autotransformer when the input voltage is below the predetermined level. A second sensing circuit and apparatus is provided which senses a second input voltage level, lower than the first, and which disconnects the load device when the input voltage is below the second level.

4 Claims, 1 Drawing Figure

PATENTED SEP 4 1973
3,757,202
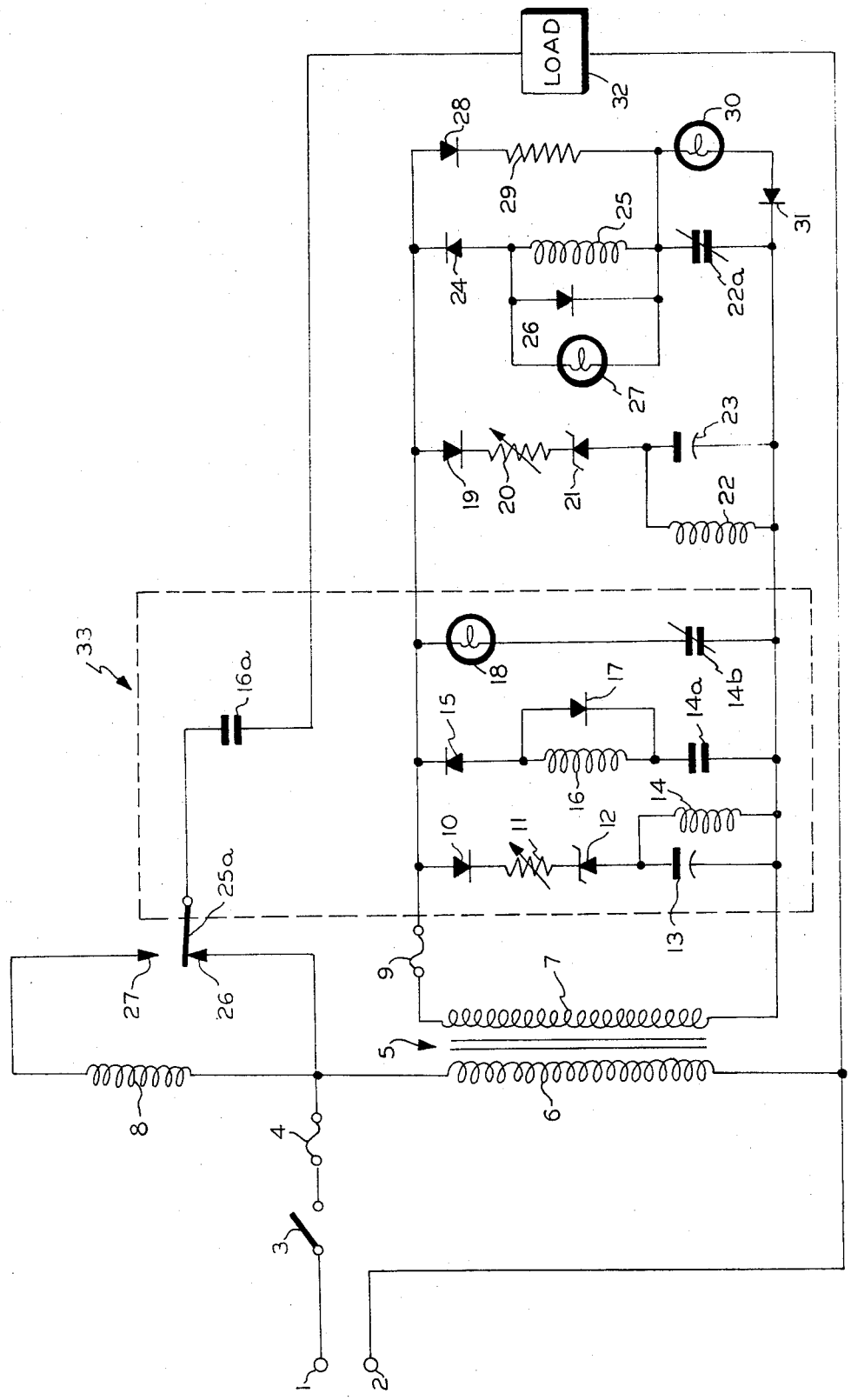

LINE VOLTAGE REGULATOR

BACKGROUND OF THE INVENTION

This invention relates to power supplies and is specifically directed to power supplies where the load voltage is desired to remain within certain upper and lower limits.

In many areas of the world household line voltage regulation is poor. This makes it necessary to regulate the voltage supplied to certain household appliances so that they may operate properly. Accurate voltage regulators are available, but their cost is prohibitive if it is desired to use them in conjunction with an inexpensive household appliance. Therefore, it is desirable to produce a voltage regulator which is relatively inexpensive but at the same time supplies a fairly constant voltage to the load.

Previous attempts to develop such a device have utilized a number of relays, controlled by voltage regulator tubes or other relays, which act to switch in the boost winding of an autotransformer. The problem with this is that voltage sensitive relays have been used. These relays do not pick-up and drop-out at the same level. Circuitry has been devised which in effect creates a relay that picks up and drops out at the same level. Unfortunately, this circuitry is too complicated and expensive to use in conjunction with inexpensive household appliances. When voltage regulator tubes are used, power consumption is high.

With some motor driven appliances it is necessary to operate the device above a minimally acceptable voltage level. This is true because the motor windings will heat up at low voltages. If this condition persists the motor will eventually burn out. Therefore, it is necessary to protect these appliances from low voltages.

SUMMARY OF THE INVENTION

An improved line voltage regulator can be made in accordance with this invention. As in the prior art, the boost winding of an autotransformer is switched in to increase the voltage supplied to the load device. The basis of this invention is the control of the switching mechanism used to switch in the boost winding.

A low voltage cutoff device is also provided by this invention. The load is disconnected by the switching mechanism when the input voltage falls below a predetermined acceptable level. Again, this invention provides the control for the switching mechanism which disconnects the load.

Accordingly, it is an object of this invention to provide a new and improved voltage regulator system.

Another object of this invention is to provide a new and improved voltage regulator system, which is reliable and suitable for regulating the voltage of household appliances.

Another object of this invention is to provide a new and improved voltage regulator system which allows a relay to pick-up and drop-out at essentially the same voltage level and to switch in the boost winding of an autotransformer thereby increasing the voltage supplied to a load device.

Still another object of this invention is to provide a new and improved low voltage cutoff.

A further object of this invention is to provide a new and improved low voltage cutoff which allows a relay to pick-up and drop-out at essentially the same level, thereby disconnecting the load when the line voltage falls below a predetermined acceptable level.

The present invention accomplishes the above cited object by employing a Zener diode which is responsive to a voltage level. The Zener diode conducts on a positive going half cycle, energizing a first relay. A second relay, controlled by the first relay, switches only on negative going half cycles. This second relay then controls the load voltage.

DESCRIPTION OF THE PREFERRED EMBODIMENT

In the preferred embodiment of this invention terminals 1 and 2 are connected to an A.C. power source. This source may be normal household voltage of 120 volts A.C. at 60 Hertz. Also connected to terminal 1 is a switch 3 and a fuse 4.

The primary side 6 of a transformer 5 is connected to the power source through fuse 4 and switch 3. The transformer 5 is preferably an autotransformer with a voltage boost winding 8. Transformer 5 also has a sensing secondary winding 7. A fuse 9 is connected to the secondary winding 7 to protect the transformer 5.

Within the dotted line 33 is the low voltage cutoff. This is comprised of a sensing circuit, apparatus to disconnect the load when the voltage drops below a predetermined level, and indicating means to indicate when the load 32 is disconnected.

The operation of the low voltage cutoff is as follows:
Assume that the input voltage is large enough and it is desired that the load 32 be connected to a source of power. Then, on a positive going half cycle diode 10 will conduct. Also Zener diode 12 will conduct. Coil 14 of a relay will be energized, closing contact 14a and opening contact 14b. This will turn off pilot light 18, indicating that the load 32 is connected to the power source. On the next negative going half cycle, since contact 14a is closed, coil 16 will be energized because diode 15 will conduct. This closes contact 16a, connecting the load 32 to a power source.

If, however, the input voltage is below the desired level, Zener diode 12 will not conduct, coil 14 will be deenergized, contact 14a will be open and contact 14b will be closed. Due to contact 14b being closed, pilot light 18 will be on, indicating disconnection of the load 32. Coil 16 will be deenergized and contact 16a open, disconnecting the load 32. Diode 17 prevents chattering of the power relay and diode 15 prevents an increase in secondary current each time relay contact 14a closes on the same half cycle as the sensing circuit. Capacitor 13 in parallel with relay coil 14 provides suitable filtering, and trimpot 11 allows adjustment of the cutoff level.

The voltage boost power supply is that part of the circuit outside the dotted line 9. This is comprised of a sensing circuit, apparatus to switch in the boost winding 8 when the line voltage falls below a predetermined level, and indicating means to indicate when the load voltage is being boosted.

The operation of the voltage boost power supply is similar to that of the low voltage cutoff and is as follows:

Assume the input voltage is too low and requires boosting. Then on a positive half cycle diode 19 will conduct but Zener diode 21 will not, thereby deenergizing the relay coil 22. This leaves the normally closed relay contact 22a closed. Then on the next negative going half cycle diode 24 conducts, energizing coil 25 of a relay which switches contact 25a to contact 27, thereby connecting the boost winding to the load 32. Pilot light 27 indicates when the load voltage is being boosted. Trimpot 20 allows the voltage boost level to be adjusted and capacitor 23 provides filtering.

Finally resistor 29 provides a current path for pilot light 30, which indicates when normal line voltage is being supplied to the load 32. Diode 31 blocks current flow through the relay coil 25 when contact 22a is open. And diode 28 reduces power dissipation in resistor 29 when contact 22a is closed.

It will be understood to one skilled in the art that numerous changes may be made in the above-described apparatus without departing from the true spirit of the invention. It is intended that the above description of the invention is illustrative and is not intended to limit the invention in any manner.

We claim:

1. A voltage regulating circuit and apparatus for regulating the voltage supplied to a load, comprising:
   a voltage sensitive switching means which switches on a positive going half cycle of an input voltage, wherein said voltage sensitive switching means comprises:
      a voltage breakdown device sensitive to a voltage level of a positive going half cycle of said input voltage;
      a first relay controlled by said breakdown device;
   a second switching means responsive to said voltage sensitive switching means for controlling the voltage supplied to a load and operating only on a negative going half cycle of the input voltage, wherein said second switching means comprises:
      a second relay controlled by said first relay, said second relay switching only on negative going half cycles of the input voltage, whereby said second relay controls the voltage supplied to a load.

2. The voltage regulating circuit and apparatus as claimed in claim 1 wherein said voltage breakdown device is a Zener diode.

3. The circuit and apparatus according to claim 1 wherein:
   said input voltage is connected to an autotransformer;
   said second relay connects the load to the boost winding of said autotransformer when said second relay is energized thereby increasing the voltage supplied to said load.

4. The circuit and apparatus according to claim 1 wherein:
   said second relay disconnects said load when said second relay is deenergized.

* * * * *